United States Patent [19]

Buhler et al.

[11] 3,899,469

[45] Aug. 12, 1975

[54] PROCESS FOR THE MANUFACTURE OF NEW CONDENSATES

[75] Inventors: Arthur Buhler, Rheinfelden; Hans Ulrich Schutz, Basel; Dieter Mausezahl, Biel-Benken; Melvin Harris, Dornach; Christian Guth, Basel, all of Switzerland

[73] Assignee: Ciba Geigy AG, Basel, Switzerland

[22] Filed: Aug. 15, 1973

[21] Appl. No.: 388,517

Related U.S. Application Data

[60] Division of Ser. No. 104,142, Jan. 5, 1971, Pat. No. 3,776,767, which is a continuation of Ser. No. 768,495, Oct. 17, 1968, abandoned.

[30] Foreign Application Priority Data

Oct. 24, 1967 Switzerland.................. 14826/67

[52] U.S. Cl...... 260/67.5; 117/139.4; 117/139.5 A; 117/161 LN; 260/29.4 R; 260/29.4 VA; 260/67.6 R; 260/67.6 C; 260/69 F; 260/70 R; 260/70 M; 260/249.6; 260/249.8
[51] Int. Cl............................................. C08g 9/32
[58] Field of Search......... 260/67.5, 67.6 R, 67.6 C, 260/69 R, 69 F, 69 N, 70 R; 117/139.4, 139.5 A

[56] References Cited

UNITED STATES PATENTS

| 3,079,279 | 2/1963 | Van Loo.................. 117/139.4 |
| 3,789,040 | 1/1974 | McKeown et al............ 260/69 R X |

FOREIGN PATENTS OR APPLICATIONS

| 967,251 | 10/1950 | France |
| 1,242,188 | 8/1960 | France |
| 562,593 | 11/1957 | Belgium |

Primary Examiner—Howard E. Schain
Assistant Examiner—W. C. Danison
Attorney, Agent, or Firm—Joseph G. Kolodny; Edward McC. Roberts; Prabodh I. Almaula

[57] ABSTRACT

This invention provides new condensation products which are obtained by reacting a monocyclic or dicyclic heterocyclic compound having 5 to 7 ring members, at least two members being nitrogen and at least two halogen atoms being linked directly with the carbon atoms of the heteroring, with a thiourea compound or an alkali or ammonium hydrogensulfide and a mono- or dialkanolamine.

These condensation products are useful as agents for textile finishing, especially for improving crease resistance and abrasion resistance.

4 Claims, No Drawings

PROCESS FOR THE MANUFACTURE OF NEW CONDENSATES

This application is a division of application Serial Number 104 142, filed Jan. 5, 1971, now U.S. Pat. No. 3,776,767, which in turn is a continuation of application Ser. No. 768,495, filed Oct. 17, 1968, and now abandoned.

It has been found that valuable new condensates are obtained that are capable of substantially counteracting the impairment of the mechanical properties occurring when finishing cellulosic textile materials with aminoplasts, when in an aqueous medium at a temperature from −10° to +30°C, in each case at a molecular ratio of 1 : 2 to 1 : 0.5, preferably from 1 : 1.5 to 1 : 0.5, a colourless heterocyclic compound that contains at least 2 nitrogen atoms in the hetero ring and at least 2 halogen atoms linked with carbon atoms of the hetero ring, is reacted with A. a thiourea compound that contains at least one hydrogen atom linked with nitrogen, preferably thiourea itself, or with an alkali metal or ammonium hydrogensulphide and B. a mono- or di-alkanolamine containing 1 to 4 carbon atoms, preferably with mono- or diethanolamine, the reaction is then finalized at a temperature from 30° to 100°C, preferably from 45° to 70°C and, if desired, water is distilled out of the mixture formed.

The heterocyclic compound used as starting material in the present process must be practically colourless and contain at least one, preferably only one, heterocycle which may be altogether the only ring of the compound or, for example, may also contain a fused-on aromatic six-membered ring. Specially useful are compound with six-membered heterorings, especiallly those whose ring contains 2 or 3 nitrogen atoms and 4 or 3 carbon atoms, such as pyridazine, pyrimidine, quinazoline and especially 1,3,5-triazine compounds. These compounds contain at least 2 halogen atoms linked with carbon atoms of the hetero ring, for example bromine or preferably chlorine atoms. As relevant examples there may be mentioned trichlorpyrimidine, tetrachloropyrimidine, 2,4-dichloroquinazoline, 2,4,6-tribromo-1,3,5-triazine and in the first place 2,4,-6-trichloro-1,3,5-triazine (cyanuric chloride).

As further starting materials there are required a thiourea compound containing at least one hydrogen atom linked with nitrogen, or preferably thiourea itself or an alkali metal or ammonium hydrogensulphide, as well as a monoalkanolamine or dialkanolamine containing 1 to 4 carbon atoms, preferably mono- or diethanolamine.

The reaction is performed in an aqueous medium that may contain apart from water organic solvents, especially those which are water-miscible. There may be mentioned lower alcohols and acetone.

No specific sequence of the reaction stages is prescribed, that is to say, the heterocyclic compound may be reacted first with the sulphur-containing compound or first with the alkanolamine.

For the reaction of every mol of component (A) or (B) with the heterocyclic compound 1 mol of alkali - or a slight excess - in form of an aqueous alkali metal hydroxide or carbonate solution is added to the reaction mixture, either in one lot or portionwise.

The reactions are performed within the temperature range from −10° to +30°C; in the presence of an organic solvent the reaction temperature may be below 0°C, whereas when purely aqueous reaction media are used it is advantageous to react at 0°C or slightly higher.

It is advantageous to start with the second reaction step in each case only after the first reaction is substantially complete; this is approximately the case when after addition of the alkali, or of its last portion, the reaction medium reveals a pH value of about 7. The reaction is then finalized at a temperature from 30° to 100°C, preferably from 40 to 70°C, and may be terminated after 2 to 3 hours. The pH value of the reaction mixture during this time should be within the neutral or slightly alkaline region. A drop in pH value impairs the solubility of the reaction product substantially and can be prevented by adding more alkali. The condensates are also obtained, when in an aqueous medium at a temperature from −10° to +25°C at a pH value from 6 to 9 and at a molecular ratio from 1 : 1.5 to 1 : 0.5, a colourless heterocyclic compound that contains at least 2 nitrogen atoms in the hetero ring and at least 2 halogen atoms linked with carbon atoms of the hetero ring, is reacted with a thiourea compound and on completion of this first reaction stage, without intermediate separation, for every mol of heterocyclic halogen compound used 0.5 to 1.5 mols of a monoalkanolamine are added, while maintaining a pH value from 6 to 10 and keeping the temperature of the reaction medium first for at least 8 hours at 30° to 50°C and then for at least 5 hours at 60° to 65°C and, if desired, the water is distilled out of the mixture formed.

When the starting material used is cyanuric chloride, then, in general, for 1 mol each of this halogen compound a total of about 4 mols of monoacidic base, thus for instance 3 mols of alkali metal hydroxide and 1mol of alkanolamine, is consumed. The amount of water used as reaction medium may be freely chosen within a wide range, advantageously so that, on one hand, the reaction mixture is easy to stir from the start and the risk of heating beyond the prescribed temperature range is obviated and that, on the other hand, excessive dilution does not make the practical performance problematic. Since as a rule the heterocyclic halogen compounds are sparingly soluble in the water serving as reaction medium, it is advantageous first to convert them into a finely distributed state, which can be done in known manner by dissolution in an organic water-miscible solvent such as acetone and pouring the solution out over ice. As mentioned above, the molecular ratio heterocyclic halogen compound : sulphur-containing compound should range from 1 : 2 to 1 : 0.5, preferably from 1 : 1.5 to 1 : 0.5, and the molecular ratio of heterocyclic halogen compound : alkanolamine should likewise be within the range from 1 : 2 to 1 : 0.5, preferably from 1 : 1.5 to 1 : 0.5. Especially with cyanuric chloride particularly good results are obtained by using equimolecular proportions or amounts of the three reactants differing only little therefrom.

On completeion of the reaction the resulting product can be used as it is for the purpose indicated above. In view of the concentration of the mixture, which is not very high at the end of the reaction, it is, however, advisable to remove the water completely or partially by distillation under vacuum. In this manner generally stable products are obtained which are at most only slightly tinted and are readily and completely soluble in water.

The products obtained by the process described above are suitable, as has already been said, for use in combination with aminoplasts in textile finishing, especially for improving the shape retention. Particularly suitable for such a treatment is textile material of cellulose, if desired in combination with other fibres, for example polyester fibres. Therefore, according to a preferred use of the products of this invention textile materials are impregnated with an aqueous preparation containing a curable aminoplast precondensate, a curing catalyst and a condensate of the composition defined above, whereupon the textile material is dried and hardened by treatment at an elevated temperature.

Aminoplast precondensates are adducts of formaldehyde with methylolable nitrogen compounds. In this connection there may be mentioned amino-1,3,5-triazines such as N-substituted melamines, for example ammeline, guanamines, for example benzoguanamine or acetoguanamine. Further suitable are symmetric alkyltriazines, biuret, thiourea, alkylcarbamates, guanidine, alkyl- or aryl-ureas and -thioureas, alkylene ureas or diureas, for example ethylene urea, propylene urea or acetylene diurea; 4,5-dihydroxy-imidazolidone-2 and its derivatives, for example the 4,5-dihydroxyimidazolidone-2 substituted in 4-position on the hydroxyl group by the residue —$CH_2$—$CH_2$—CO—N-H—$CH_2$—OH. The methylol compounds of urea and of melamine are preferred and in the case of melamine compounds those of a low or high degree of methylolation may be used. It is also possible to use compounds whose methylol groups are more or less completely etherified, for example, with methyl groups.

As curing catalysts the conventional acid or potentially acid compounds may be used, such a ammonium chloride, magnesium chloride or zinc fluoroborate.

Particularly valuable results are also obtained when the preparation used for finishing the textile materials contains in addition to the aminoplast precondensate, the curing agent and the condensate of this invention also an emulsion polymer prepared from an N-methylolamide of an $\alpha,\beta$-ethylenically unsaturated carboxylic acid or an ether of such a methylolamide and an alkaline earth metal salt of an $\alpha,\beta$-ethylenically unsaturated monocarboxylic acid, especially the copolymers, obtained in an aqueous emulsion, from a. 0.25 to 10% by weight of an alkaline earth metal salt of an $\alpha,\beta$-ethylenically unsaturated monocarboxylic acid (for example calcium acrylate), b. 0.25 to 30 percent by weight of an N-methylolamide or N-methylolamide ether of an $\alpha,\beta$-unsaturated mono- or dicarboxylic acid (for example acrylic acid methyldamide, methacrylic acid methylolamide or the methyl ethers of these methylolamides).

c. 99.5 to 60 percent by weight of at least one further copolymerizable compound, for example an ester of acrylic or methacrylic acid and an alkanol such as methanol, ethanol, n-butanol, acrylic acid tertiary butylamide, vinylidenechloride, vinylacetate, acrylonitrile, styrene.

Depending on the purpose to be served by the finish the aqueous preparations may contain further ingredients, for example hydrophobizing agents, suitable optical brighteners, wetting agents, dispersants or flameproofing agents, especially phosphorus compounds such as dialkylphosphono-propionic acid methylolamides. In very many cases it is also advisable to add, for example, a nonionic agent that produces a soft handle, for example an aqueous emulsion of a methylolmelamine alkyl ether modified by stearic acid alkylolamide residues.

The proportions of the ingredients of the aqeous preparations may vary within wide limits and may be adapted to the purpose in hand. In general it is indicated to use for 10 parts of aminoplast precondensate 1 to 4 parts of condensate from heterocyclic halogen compound, thiourea and alkanolamine. Otherwise, the textile material may be treated in the usual manner. For example, undyed or dyed fabric or tricot may be impregnated on a padder with the preparation and, advantageously after an intermediate drying operation at a temperature of up to 100°C, subjected to a treatment with dry heat of 140° – 180°C for 2 to 20 minutes, the temperature and the duration of the treatment being adapted to the purpose of the treatment which may be, for example, an improvement of the wet fastness properties for direct dyeing dyestuffs, an anti-crease finish or permanent shaping (permanent press). The finishing operation may also be combined with a dyeing operation, for example so that the impregnating solution further contains a dyestuff which, by virtue of special substituents, is reactive towards the fibre or more especially towards the aminoplast precondensate and, by virtue of this property, is fixed on the substrate during the heat treatment or even before it.

As is known an aminoplast resin finish impairs the mechanical properties of cellulosic fibrous materials, especially their tensile strength and abrasion resistance; in general the loss in strength is the greater the higher the content of aminoplast and the more energetic the hardening is. As mentioned above, these serious drawbacks can be substantially prevented with the aid of the new condensates or at least they can be reduced to an acceptable degree. In addition it has been observed that these condensates improve the soil release from the fibre.

Example 1

A solution of 190 g (1 mol) of cyanuric chloride in 1 litre of acetone is poured over a mixture of 1 litre of water and 1 kg of ice and the precipitated cyanuric chloride is filtered off. The paste is introduced into a solution which has been prepared at 45°C from 76 g (1 mol) of thiourea and 1/2 litre of water and has then been cooled by adding 1/2 kg of ice. By dropping in a 5N-sodium hydroxide solution the pH value is maintained at 6.7 to 6.9 during this first condensation stage and the temperature is maintained at 8 to 10°C by indirect cooling. After about 5 hours and a consumption of about 3.5 mols of sodium hydroxide the pH value remains constant, and practically everything is dissolved in the reaction mixture. Then one lot of 61 g (1 mol) of monoethanolamine is added and the solution, which is now clear, is heated in a second condensation stage for 15 hours at 35° to 40°C and in a third stage for 8 hours at 55° to 60°C. During this time further sodium hydroxide solution is added as and when required so that the pH value remains constant at 7.0, for which about 0.5 mol of sodium hydroxide is needed. Finally, the solution is evaporated to dryness at 90° to 100°C under vacuum and the residue is ground in a ball mill.

to furnish 410 g of a faintly yellowish, readily water-soluble hygroscopic powder = condensate A.

Apart from product A the following Table lists further condensates obtained in this manner, together with the appropriate data for their manufacture:

100 ml of acetone and at 0°C 6.1 g (0.1 mol) of monoethanolamine are added in one lot. By dropping in 5.3 g (0.05 mol) of anhydrous sodium carbonate in 15 ml of water during 1 hour the pH value of the reaction mixture is maintained at about 7.

Table I

| | Quantity in mols | | | 1st stage | | | 2nd stage | | | 3rd stage | | | Working up |
|---|---|---|---|---|---|---|---|---|---|---|---|---|---|
| | Cyanuric chloride | thiourea | ethanolamine | temp. | hrs. | pH-value | temp. | hrs. | pH-value | temp. | hrs. | pH-value | E = evaporate in vacuo at °C |
| A | 1 | 1 | 1 | 8-10 | 5 | 6.7-6.9 | 35-40 | 15 | 7 | 55-60 | 8 | 7 | E 90-100 |
| B | 1 | 1 | 1 | 0-10 | 8 | 6.0-6.5 | 35-40 | 14 | 7 | 55-60 | 9 | 7 | E 90-100 |
| C | 1 | 1 | 1 | 0-12 | 2 | 8-9 | 35-40 | 15 | 7 | 55-60 | 8 | 7 | E 90-100 |
| D | 1 | 1 | 1 | 0-10 | 4½ | 7 | 35-40 | 15 | 7 | 55-60 | 8 | 7 | E 90-100 |
| E | 1 | 1 | 1 | 0-8 | 5 | 7 | 35-40 | 14 | 7 | 55-60 | 9 | 7 | E 90-100 |
| F | 1 | 1.5 | 0.5 | 0-10 | 8 | 7 | 35-40 | 13 | 7 | 55-60 | 7 | 7 | E 90-100 |
| G | 1 | 0.5 | 1.5 | 0-10 | 22 | 7 | 35-40 | 22 | 7 | 55-60 | 8 | 7 | E 90-100[1] |
| H | 2 | 2 | 2 | 0-12 | 14 | 7 | 35-40 | 18 | 7 | 55-60 | 8 | 7 | E 90-100[1] |

[1]filtering off insoluble residue before

Example 2

A solution of 18.5 g (0.1 mol) of cyanuric chloride in 100 cc of acetone is poured out over a mixture of 0.1 litre of water and 0.1 kg of ice, and the precipitated cyanuric chloride filtered off. The paste is introduced into a solution which has been prepared at 45°C from 7.6 g (0.1 mol) of thiourea and 50 ml of water and then cooled by adding 50 g of ice thereto. In this first condensation stage the pH value is maintained at 6.7 to 6.9 by dropping in a 5N-sodium hydroxide solution and the temperature is kept at 8° to 10°C by indirect cooling. After about 5 hours and a consumption of about 3.5 mols of sodium hydroxide the pH value remains constant and practically all has dissolved in the reaction mixture. One lot of 10.5 g (0.1 mol) of diethanolamine is then added and the reaction mixture heated to 55° to 60°C while adding another 10 ml of 5N-sodium hydroxide solution (0.05 mol) and then heated at this temperature with stirring for 5 hours.

The solution is then evaporated to dryness at 60°C under vacuum, to yield 46 g of a pale yellowish, readily water-soluble powder: condensate J.

Example 3

A suspension of 18.5 g (0.1 mol) of cyanuric chloride in 100 ml of alcohol is cooled to 5° to 10°C. One lot of 6.1 g (0.1 mol) of monoethanolamine is added; during 15 minutes 20 ml of 5N-sodium hydroxide solution (0.1 mol) are dropped in and the reaction mixture is stirred for about 1 hour at the same temperature until a constant pH value of about 2.7 has been established.

On addition of 7.6 g (0.1 mol) of thiourea and 30 ml of 5N-sodium hydroxide solution (0.15 mol), in each case in one lot, the pH value of the reaction mixture temporarily reaches 11 which drops again to 7 after another 30 minutes' reaction, during which the temperature is raised to 30° to 40°C. Then another 20 ml of 5N-sodium hydroxide solution are added and the reaction terminated after stirring for 2½ hours.

The resulting colourless suspension is evaporated to dryness at 40°C under vacuum, to leave 40 g of a pale yellow, readily water-soluble product: condensate K.

Example 4

18.5 Grams (0.1 mol) of cyanuric chloride are suspended in 200 ml of a mixture of 100 ml of water and Then 7.6 g (0.1 mol) of thiourea and 20 ml (0.1 mol) of 5N-sodium hydroxide solution are added. When the pH value has dropped to 7, the temperature is raised to 50°C and the reaction finalized by stirring for 90 minutes, during which another 40 ml (0.2 mol) of 5N-sodium hydroxide solution are gradually added. The resulting reaction mixture is evaporated to dryness under vacuum, to yield 40 g of a readily water-soluble condensate: condensate L.

Example 5

A suspension of 18.5 g (0.1 mol) of cyanuric chloride in 150 ml of water is mixed within 60 minutes at 0°C with 14.35 ml (0.1 mol) of a 39.1 percent solution of sodium hydrosulphide.

The resulting yellow suspension is mixed at room temperature with 6.1 g (0.1 mol) of monoethanolamine and then with one lot of 20 ml (0.1 mol) of 5N-sodium hydroxide solution. The batch is then heated to 50°C and heated and stirred at this temperature for about 2 hours. After this time the reaction mixture reveals a pH value of about 7.

Another 20 ml (0.1 mol) of 5N-sodium hydroxide are added and the reaction continued for 3 hours at the same temperature, whereupon it is terminated, and the pH value adjusts itself at 10. The reaction mixture is first filtered to remove the insoluble components (5.5 g of a yellowish substance) and the filtrate is then evaporated to dryness at 60°C under vacuum, to yield 26.5 g of a white powder: condensate M.

Example 6

Aqueous padding liquors are prepared with the use of the substances listed below:

a. Aminoplast precondensate 50 percent aqueous solution of a mixture of dimethylolethylene urea and methyl ether of a highly methylolated melamine.

b. Softening agent 30 percent dispersion of a methyl ether (modified with stearic acid alkanolamides) of a highly methylolated melamine.

c. Copolymer 27 percent aqueous emulsion of a copolymer from 80 parts of acrylic acid n-butyl ester, 13 parts of vinylidenechloride, 6 parts of acrylic acid methylolamide and 1 part of calcium acrylate.

d. Condensate prepared as described in Example 1 from cyanuric chloride, thiourea and monoethanolamine: condensate A.

Mercerised and bleached cotton popelin is then impregnated with padding liquors, whose composition is shown in Table II, to a weight increase of 60 percent, referred to the original weight of the fabric. The fabric is dried at 60° to 80°C and then heat-treated for 4½ minutes at 155°C, then washed for 5 minutes in a boiling sodium carbonate solution of 0.2 percent strength, rinsed in cold water and dried.

and heated for 13 minutes at 170°C. The fabric is then washed for 5 minutes in a boiling 0.2 percent sodium carbonate solution, rinsed in cold water and dried.

Example 8

Aqueous padding liquors are prepared with the use of the under-mentioned substances:

a. Aminoplast precondensate
  50 percent aqueous solution of a mixture of dimethylol-ethylene urea and methyl ether of a highly methylolated melamine.

b. Softening agent
  30 percent aqueous dispersion of a methyl ether (modified with stearic acid alkanolamides) of a highly methylolated melamine.

Table II

| | | | | | | | | | | |
|---|---|---|---|---|---|---|---|---|---|---|
| (a) | Aminoplast precondensate g/litre | — | 150 | 150 | 150 | 150 | 100 | 100 | 100 | 100 |
| (b) | Softening agent g/litre | — | 30 | 30 | 30 | 30 | 30 | 30 | 30 | 30 |
| (c) | Copolymer emulsion g/litre | — | — | — | 40 | 40 | — | — | 40 | 40 |
| (d) | Condensate A g/litre | — | — | 40 | — | 40 | — | 40 | — | 40 |
| | $MgCl_2.6H_2O$ g/litre | — | 19 | 19 | 19 | 19 | 13 | 13 | 13 | 13 |
| | $CH_3COOH$, 40% g/litre | — | 0.5 | 0.5 | 0.5 | 0.5 | 0.5 | 0.5 | 0.5 | 0.5 |
| | pH of padding liquor | — | 5.6 | 6.2 | 5.6 | 6.2 | 5.6 | 6.2 | 5.6 | 6.2 |
| | tens.strength (%) 1) | 100 | 43 | 61 | 50 | 61 | 55 | 65 | 54 | 69 |
| | abrasion res.(%) 2) | 100 | 18 | 65 | 28 | 73 | 43 | 89 | 54 | 105 |
| | crease resist. in ° 3) | 50 | 130 | 113 | 137 | 124 | 119 | 100 | 124 | 110 |
| | crease angle, wet in ° 4) | 59 | 128 | 111 | 137 | 128 | 119 | 113 | 124 | 125 |

1) Measuring the tensile strength of specimens 25 cm × 50 cm by increasing loads until the fabric tears (SNV 98461). The load required to bring this about is taken as 100% for the untreated fabric. The figures in columns 1 to 8 indicate how many % of this load are needed to cause the treated fabric samples to tear.
2) For measuring the abrasion resistance a loaded abrasive element (brushes with nylon bristles) performs a constant revolution on the test specimen which likewise revolves at a constant speed. The number of abrasive rotations (n) are counted that are needed to hole the tested material, after having ascertained this number with untreated material (m). From the results obtained the abrasion resistance values (A) of the treated fabric specimens are calculated: A = 100n/m.
3), 4) To determine the crease angle dry and evenly moistened rectangular pieces of fabric, cut diagonally across the fibres, measuring 16 mm × 44 mm are folded parallel to the short side, placed in between glass plates and loaded with 2 kg-weights. After 5 minutes loading and 1 hour's recovery the test specimens are introduced into an angle measuring instrument of conventional design and the crease angle is measured.

Example 7

Padding liquors are prepared as indicated in Table III with the use of the additives (b) to (e). The composition of the substances (b) to (d) has been described in Example 2. The aminoplast precondensate used here is the methylolated glyoxal monourein (e) instead of the melamine compound (a).

Mercerized cotton popelin is impregnated with the liquors of this composition, then dried at 60° to 80°C c. Copolymer
  27 percent aqueous emulsion of a copolymer from 80 parts of acrylic acid n-butyl ester, 13 parts of vinylidenechloride, 6 parts of acrylic acid methylolamide and 1 part of calcium acrylate.

d. Wetting agent
  25 percent aqueous solution of an adduct of p-nonylphenol with 9 mols of ethylene oxide.

e. Brightening agent of the formula

Table III

| | | 0 | 1 | 2 | 3 | 4 |
|---|---|---|---|---|---|---|
| (a) Aminoplast precondensate | g/litre | — | 140 | 140 | 140 | 140 |
| (b) softening agent | g/litre | — | 30 | 30 | 30 | 30 |
| (c) copolymer | g/litre | — | — | — | 40 | 40 |
| (d) condensate A | g/litre | — | — | 40 | — | 40 |
| $Zn(NO_3)_2.6H_2O$ | g/litre | — | 13 | 13 | 13 | 13 |
| pH-value of padding liquor | | — | 4.5 | 5.1 | 4.6 | 5.1 |
| tensile strength % | 1) | 100 | 25 | 51 | 28 | 52 |
| abrasion resistance % | 2) | 100 | 6 | 40 | 5 | 48 |
| crease angle, dry,in ° | 3) | 47 | 143 | 126 | 149 | 132 |
| crease angle,wet, in ° | 4) | 64 | 124 | 112 | 131 | 119 |

Concerning 1), 2), 3) and 4): The measuring of these values has been explained following upon Table II.

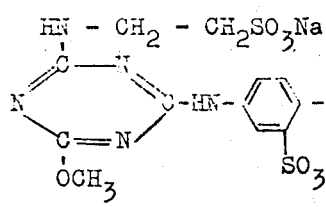
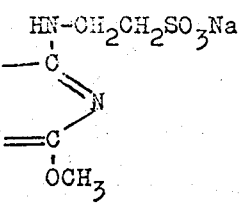

f. One of the following condensates:
1. Condensate from cyanuric chloride, thiourea and monoethanolamine, prepared according to Example 1: condensate A.
2. Condensate from cyanuric chloride, monoethanolamine and thiourea, prepared according to Example 3: condensate K.
3. Condensate from cyanuric chloride, sodium hydrogen-sulphide and monoethanolamine, prepared according to Example 5: condensate M.

g. Magnesium chloride hexahydrate ($MgCl_2.6H_2O$).

Mercerized and bleached cotton popelin is impregnated with padding liquors composed as shown in Tables IV, V and VI to a weight increase of 60% referred to the original weight of the fabric. After having been dried at 60° to 80°C the fabric is heat-treated for 4½ minutes at 155°C, then washed for 5 minutes in a boiling 0.2 percent sodium carbonate solution, rinsed in cold water and dried.

We claim:
1. Textile finishing compositions for improving the crease and abrasion resistance of textile materials containing (1) a curable aminoplast precondensate, (2) a condensation product obtained by reacting
   A. cyanuric chloride with
   B. a member selected from the group consisting of thiourea, sodium-, potassium- and ammonium hydrogensulfide, and
   C. a member selected from the group consisting of a monoalkanolamine and a dialkanolamine with 1 to 4 carbon atoms in an aqeous medium at a temperature from about 10° to 30° C at a molecular ratio for (B) as well as for (C) from 1:2 to 1:0.5, then finalizing the reaction at temperatures from 30° to

Table IV

| | | 0 | 1 | 2 | 3 | 4 |
|---|---|---|---|---|---|---|
| (a) Aminoplast precondensate | g/litre | — | 150 | 150 | 150 | 150 |
| (b) Softening agent | g/litre | — | 30 | 30 | 30 | 30 |
| (c) Copolymer emulsion | g/litre | — | — | — | 40 | 40 |
| (d) Wetting agent | g/litre | — | 3 | 3 | 3 | 3 |
| (e) Brightening agent | g/litre | — | 3 | 3 | 3 | 3 |
| (f) Condensate A | g/litre | — | — | 10 | — | 10 |
| (g) $MgCl_2.6H_2O$ | g/litre | — | 15 | 15 | 15 | 15 |
| pH-value of the padding liquor | | — | 5.9 | 5.9 | 5.9 | 5.9 |
| tensile strength (%) | 1) | 100 | 63 | 69 | 63 | 69 |
| abrasion resistance (%) | 2) | 100 | 19 | 59 | 39 | 103 |
| crease angle in ° | | | | | | |
| (a) dry | 3) | 53 | 133 | 122 | 130 | 127 |
| (b) wet | 4) | 65 | 116 | 121 | 124 | 126 |

1) to 4). These values are measured as described following Table II.

Table V

| | | 0 | 1 | 2 | 3 | 4 |
|---|---|---|---|---|---|---|
| (a) Aminoplast precondensate | g/litre | — | 150 | 150 | 150 | 150 |
| (b) Softening agent | g/litre | — | 30 | 30 | 30 | 30 |
| (c) Copolymer emulsion | g/litre | — | — | —40 | 40 | 30 |
| (d) Wetting agent | g/litre | — | 3 | 3 | 3 | 3 |
| (e) Brightening agent | g/litre | — | 3 | 3 | 3 | 3 |
| (f) Condensate K | g/litre | — | — | 5 | — | 5 |
| (g) $MgCl_2.6H_2O$ | g/litre | — | 15 | 15 | 15 | 15 |
| pH-value of the padding liquor | | — | 5.9 | 5.9 | 5.9 | 5.9 |
| tensile strength (%) | 1) | 100 | 63 | 69 | 63 | 72 |
| abrasion resistance (%) | 2) | 100 | 19 | 55 | 39 | 88 |
| crease angle in ° | | | | | | |
| (a) dry | 3) | 53 | 133 | 123 | 130 | 120 |
| (b) wet | 4) | 65 | 116 | 120 | 124 | 117 |

Table VI

| | | 0 | 1 | 2 | 3 | 4 |
|---|---|---|---|---|---|---|
| (a) Aminoplast precondensate | g/l | — | 150 | 150 | 150 | 150 |
| (b) Softening agent | g/l | — | 30 | 30 | 30 | 30 |
| (c) Copolymer emulsion | g/l | — | — | — | 40 | 40 |
| (d) Wetting agent | g/l | — | 3 | 3 | 3 | 3 |
| (e) Brightening agent | g/l | — | 3 | 3 | 3 | 3 |
| (f) Condensate M | g/l | — | — | 10 | — | 10 |
| (g) $MgCl_2.6H_2O$ | g/l | — | 15 | 15 | 15 | 15 |
| pH-value of the padding liquor | | — | 5.9 | 5.9 | 5.9 | 5.9 |
| tensile strength (%) | 1) | 100 | 63 | 69 | 63 | 71 |
| abrasion resistance (%) | 2) | 100 | 19 | 48 | 39 | 94 |
| crease angle in ° | | | | | | |
| (a) dry | 3) | 53 | 133 | 119 | 130 | 127 |
| (b) wet | 4) | 65 | 116 | 119 | 124 | 126 |

1) to 4). These values are measured as described following upon Table II.

100° C and removing water from the resulting mixture by distillation, and (3) a curing catalyst, the ratio by weight of aminoplast precondensate: condensation product being from about 10:1 to 10:4.

2. Compositions according to claim 1, wherein the aminoplast precondensate comprises an adduct of formaldehyde with a nitrogen compound reactable therewith to form an N-methylol group.

3. Compositions according to claim 1, wherein the curing catalyst is a member selected from the group consisting of magnesium chloride, ammonium chloride, zinc nitrate and zinc fluoborate.

4. Condensation product according to claim 1, obtained by reacting

A. cyanuric chloride with
B. a member selected from the group consisting of thiourea, sodium-, potassium- and ammonium hydrogensulfide, and
C. a member selected from the group consisting of a monoalkanolamine and a dialkanolamine with 1 to 4 carbon atoms in an aqeous medium at a temperature from about −10° to +30°C at a molecular ratio for (B) as well as for (C) from 1:2 to 1:0,5, then finalizing the reaction at temperatures from 30° to 100° C and removing water from the resulting mixture by distillation.

* * * * *